US009550419B2

(12) United States Patent
Habashima et al.

(10) Patent No.: US 9,550,419 B2
(45) Date of Patent: Jan. 24, 2017

(54) SYSTEM AND METHOD FOR PROVIDING AN AUGMENTED REALITY VEHICLE INTERFACE

(71) Applicant: Honda Motor Co., Ltd., Tokyo (JP)

(72) Inventors: Yoshiyuki Habashima, Redondo Beach, CA (US); Fuminobu Kurosawa, San Jose, CA (US); Arthur Alaniz, Mountain View, CA (US); Michael Gleeson-May, San Francisco, CA (US)

(73) Assignee: Honda Motor Co., Ltd., Tokyo (JP)

( * ) Notice: Subject to any disclaimer, the term of this patent is extended or adjusted under 35 U.S.C. 154(b) by 192 days.

(21) Appl. No.: 14/160,389

(22) Filed: Jan. 21, 2014

(65) Prior Publication Data

US 2015/0202962 A1    Jul. 23, 2015

(51) Int. Cl.
| | |
|---|---|
| G09G 5/00 | (2006.01) |
| B60K 35/00 | (2006.01) |
| G06T 19/00 | (2011.01) |
| G06F 3/01 | (2006.01) |
| B60K 37/02 | (2006.01) |
| G06F 3/0482 | (2013.01) |
| G06F 3/0481 | (2013.01) |
| G08G 1/00 | (2006.01) |

(Continued)

(52) U.S. Cl.
CPC ............... *B60K 35/00* (2013.01); *B60K 37/02* (2013.01); *G02B 27/017* (2013.01); *G06F 3/017* (2013.01); *G06F 3/0482* (2013.01); *G06F 3/04817* (2013.01); *G06T 19/006* (2013.01); *G08G 1/00* (2013.01); *G08G 1/0962* (2013.01); *B60K 2350/2056* (2013.01); *G02B 2027/014* (2013.01); *G02B 2027/0138* (2013.01); *G06F 3/04847* (2013.01)

(58) Field of Classification Search
CPC ............................... G06T 19/006; G06T 19/00
USPC ......................................................... 345/633
See application file for complete search history.

(56) References Cited

U.S. PATENT DOCUMENTS

| | | | |
|---|---|---|---|
| 7,324,081 B2 | 1/2008 | Friedrich et al. | |
| 2002/0078045 A1* | 6/2002 | Dutta | 707/7 |

(Continued)

FOREIGN PATENT DOCUMENTS

| | | |
|---|---|---|
| DE | 102009058142 | 6/2011 |
| DE | 102011013760 | 9/2012 |
| DE | 102012008284 | 11/2012 |

OTHER PUBLICATIONS

V. Heun, S. Kasahara, and P. Maes. Smarter Objects: Using AR technology to Program Physical Objects and their Interactions. In CHI Extended Abstracts, 2013.*

*Primary Examiner* — Jin Ge
(74) *Attorney, Agent, or Firm* — Rankin, Hill & Clark LLP

(57) ABSTRACT

A method and system for providing an augmented reality vehicle interface. The method and system include providing an augmented reality user interface. The method and system additionally include receiving an image of a vehicle with an image capturing device. The method and system additionally include identifying a user classification category of the user that is capturing an image of the vehicle. Additionally, the method and system include presenting an augmented reality image of the vehicle by overlaying one or more virtual user interface objects on the points of interest. The method and system also includes controlling vehicle features via the one or more virtual user interface objects.

17 Claims, 13 Drawing Sheets

(51) Int. Cl.
*G08G 1/0962* (2006.01)
*G06F 3/0484* (2013.01)
*G02B 27/01* (2006.01)

(56) References Cited

U.S. PATENT DOCUMENTS

| | | | |
|---|---|---|---|
| 2008/0266323 A1* | 10/2008 | Biocca et al. | 345/633 |
| 2009/0216446 A1* | 8/2009 | Ma | G01C 21/20 701/469 |
| 2009/0237546 A1 | 9/2009 | Bloebaum et al. | |
| 2012/0040612 A1 | 2/2012 | Lee et al. | |
| 2012/0065814 A1* | 3/2012 | Seok | B60K 35/00 701/2 |
| 2013/0170710 A1* | 7/2013 | Kuoch | G06K 9/00832 382/104 |
| 2013/0194228 A1* | 8/2013 | Tuzar | 345/174 |
| 2013/0249942 A1 | 9/2013 | Green et al. | |
| 2014/0282013 A1* | 9/2014 | Amijee | 715/732 |

\* cited by examiner

SYSTEM AND METHOD FOR PROVIDING AN AUGMENTED REALITY VEHICLE INTERFACE

BACKGROUND

Vehicle components and systems have become more functional over the years. In particular, the types of capabilities, settings, and options associated with the features have also significantly improved. The number of input devices that are presented and are available to the driver and passenger have also increased. Consequently, to operate and/or manipulate these vehicle features has become a more complex undertaking for a user. In addition, this increase has resulted in the crowding of the vehicle consoles, door panels, center panels, and dashboards with numerous push buttons, turning knobs, displays, and the like. Accordingly, users are finding that this crowding has resulted in a diminished cosmetic appeal of the vehicle. In addition, this crowding of inputs and outputs leads to more user confusion as to the location and operation of options that are available. This results in the unnecessary over complication of mundane tasks associated with many vehicle features.

Recently, vehicle manufacturers have been using graphical user interface systems to provide users with added functionality and versatility when controlling vehicle features. Such technology allows many functions of the vehicle to be accessed, manipulated, and utilized by user inputs on a touch screen. Many of these user interface systems utilize numerous interface menus for changing settings for vehicle subsystems. For example, manufacturers have provided various user interfaces that are associated to specific vehicle systems that include separate settings menus. However, as with the numerous physical inputs, these virtual systems tend to be confusing and in some instances cumbersome for the user to operate.

For example, the increase in the crowding of push buttons and turning knobs are replaced with an increase of confusing touch screen menus, touch input buttons, and complicated joy stick controlled interfaces. During instances when the user is attempting to change basic settings associated with vehicle features, this technology typically requires users to search between different interfaces, screens, and a variety of different settings menus to actually find the vehicle function settings that are desired. Many times the complexity associated with this approach causes users to abandon the attempt to find, understand, and change settings that are associated with the vehicle features. As a result, many of the settings that vehicle manufacturers have designed or introduced into their vehicles are never discovered or utilized by users.

In many instances, users turn to even more complex and lengthy paper or digital based vehicle manuals to try to understand the functionality associated with their vehicle, and to determine how to control the numerous settings. However, the complexity associated with trying to find an explanation within the voluminous vehicle manuals causes users unnecessary frustration as they cannot find the information they are searching for. In many cases when users do in fact find this information, they incur difficulty in implementing settings changes due to the complexity of the process detailed within these manual.

SUMMARY

According to one aspect, a method for providing an augmented reality vehicle interface is provided. The method includes receiving an image of a vehicle with an image capturing device and identifying points of interest within portions of the image of the vehicle that correspond with vehicle features. The method includes identifying a user classification category of the user that is capturing an image of the vehicle and presenting an augmented reality image of the vehicle by overlaying the one or more virtual user interface objects on the one or more points of interest. The method also includes controlling vehicle features via the one or more virtual user interface objects.

According to a further aspect, a system for providing an augmented reality vehicle interface is provided. Specifically, in accordance with this aspect, the system includes an image capturing device for capturing an image of the vehicle. The system also includes an augmented reality vehicle interface application that is executed on the image capturing device. The system additionally includes an image processing module that is included as a module of the augmented reality vehicle interface application that identifies the directional orientation and positional location of the image capturing device with respect to the vehicle and an image recognition module that is included as a module of the augmented reality vehicle interface application that identifies points of interest that correspond with vehicle features within portions of the image of the vehicle captured by the image capturing device. The system includes a user processing module that is included as a module of the augmented reality vehicle interface application that identifies a user classification category of the user that is capturing an image of the vehicle. In addition, the system includes a virtual reality module that is included as a module of the augmented reality vehicle interface application that overlays one or more virtual user interface objects on the points of interests.

According to still another aspect, a computer readable medium including instructions that when executed by a processor execute a method for providing an augmented reality vehicle interface is provided. The method includes receiving an image of a vehicle with an image capturing device and identifying points of interest within portions of the image of the vehicle that correspond with vehicle features. The method includes identifying a user classification category of the user that is capturing an image of the vehicle and communicating with an electronic control unit of the vehicle by computer communication between the image capturing device and the electronic control unit of the vehicle. The method also includes presenting an augmented reality image of the vehicle by overlaying the one or more virtual user interface objects on the points of interest and controlling one or more vehicle features via the one or more virtual user interface objects.

DETAILED DESCRIPTION

Figure 1:
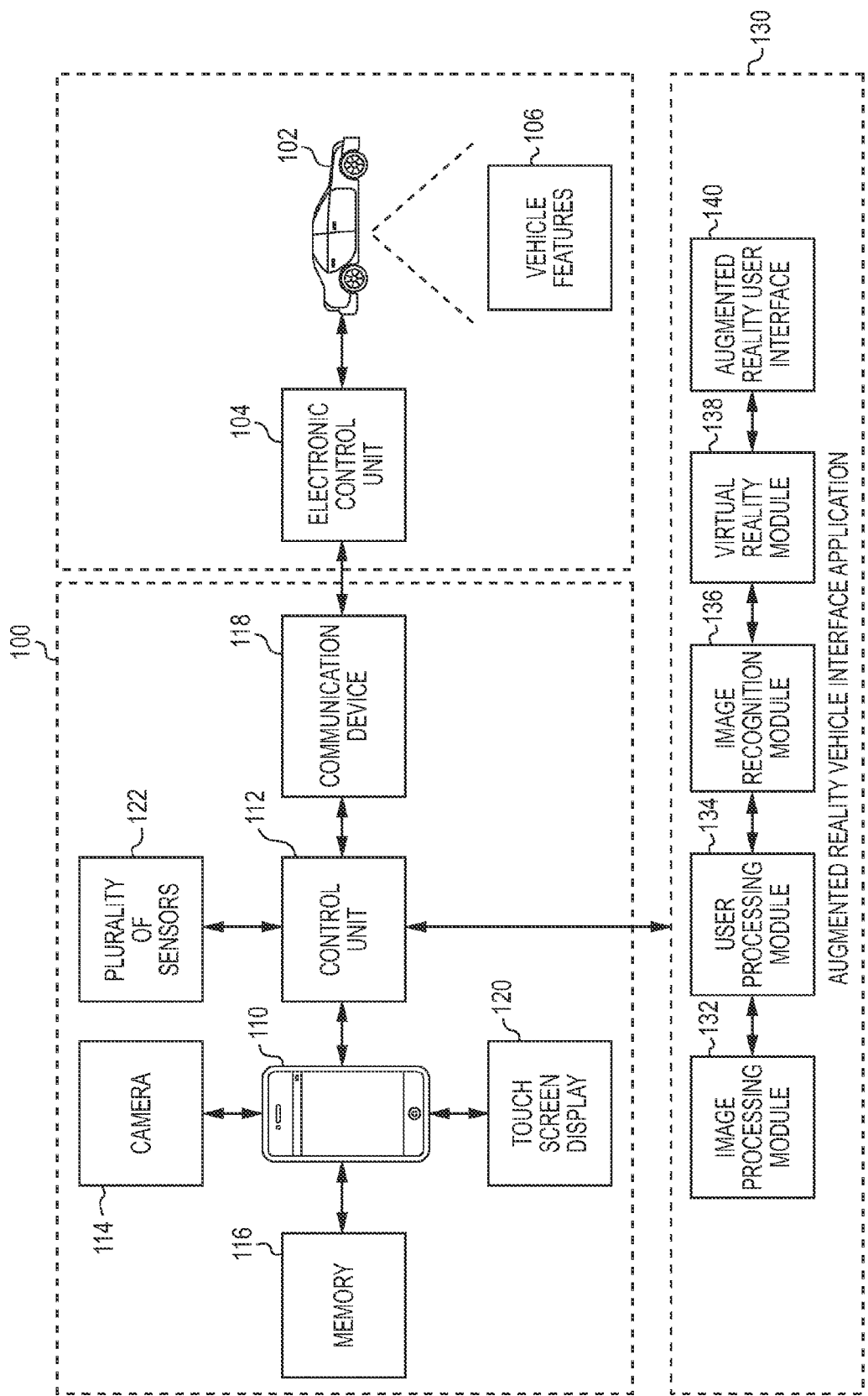
FIG. 1 is a schematic view of an operating environment for implementing augmented reality systems and methods according to an exemplary embodiment of the disclosure.

The following includes definitions of selected terms employed herein. The definitions include various examples and/or forms of components that fall within the scope of a term and that can be used for implementation. The examples are not intended to be limiting.

A "processor," as used herein, processes signals and performs general computing and arithmetic functions. Signals processed by the processor can include digital signals, data signals, computer instructions, processor instructions, messages, a bit, a bit stream, or other computing that can be received, transmitted and/or detected.

A "bus," as used herein, refers to an interconnected architecture that is operably connected to transfer data between computer components within a singular or multiple systems. The bus can be a memory bus, a memory controller, a peripheral bus, an external bus, a crossbar switch, and/or a local bus, among others. The bus can also be a vehicle bus that interconnects components inside a vehicle using protocols such as Controller Area network (CAN), Local Interconnect Network (LIN), among others.

A "memory," as used herein can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

An "operable connection," as used herein can include a connection by which entities are "operably connected", is one in which signals, physical communications, and/or logical communications can be sent and/or received. An operable connection can include a physical interface, a data interface and/or an electrical interface.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, personal watercraft, and aircraft. In some cases, a motor vehicle includes one or more engines.

An "input device" as used herein can include devices for controlling different vehicle features which are include various vehicle components, systems, and subsystems. The term "input device" includes, but it not limited to: push buttons, rotary knobs, and the like. The term "input device" additionally includes graphical input controls that take place within a user interface which can be displayed by various types of mechanisms such as software and hardware based controls, interfaces, or plug and play devices.

An "output device" as used herein can include devices that can derive from vehicle components, systems, subsystems, and electronic devices. The term "output devices" includes, but is not limited to: display devices, and other devices for outputting information and functions.

Referring now to the drawings, wherein the showings are for purposes of illustrating one or more exemplary embodiments and not for purposes of limiting the same. FIG. 1 shows a schematic view of an operating environment for implementing an augmented reality system 100 and methods according to an exemplary embodiment. Specifically, the augmented reality system 100 includes an image capturing device 110 to provide an augmented reality interface of a vehicle 102. The components of the augmented reality system 100, as well as the components of other systems, hardware architectures and software architectures discussed herein, can be combined, omitted or organized into different architecture for various embodiments. However, the exemplary embodiments discussed herein focus on the environment 100 as illustrated in FIG. 1, with corresponding system components, and related methods.

As shown in the illustrated embodiment of FIG. 1, the vehicle 102 generally includes an electronic control unit (ECU) 104 that operably controls a plurality of vehicle features 106. Vehicle features 106 include, but are not limited to, vehicle accessories and vehicle systems. The vehicle accessories include, but are not limited to, vehicle switches, vehicle controls, vehicle push buttons, vehicle compartments, vehicle latches, vehicle handles, and the like. The vehicle systems include, but are not limited to, vehicle navigation systems, vehicle HVAC systems, vehicle audio systems, vehicle video systems, vehicle infotainment systems, vehicle telephone systems, and the like.

The ECU 104 includes internal processing memory, an interface circuit, and bus lines for transferring data, sending commands, and communicating with the vehicle features 106. Generally, the ECU 104 includes a processor and memory (not shown). The ECU 104 also includes a communications device (not shown) for sending data internally in the vehicle 102 and externally to connected devices. The communication device included within the ECU 104 is capable of providing wired or wireless computer communications utilizing various protocols to be utilized to send/receive electronic signals internally to the vehicle features 106 and to external devices such as the image capturing device. Generally, these protocols include a wireless system (e.g., IEEE 802.11, IEEE 802.15.1 (Bluetooth)), a near field communication system (NFC) (e.g., ISO 13157), a local area network (LAN), and/or a point-to-point system. Additionally, the communication device of the ECU 104 is operably connected for internal computer communication via a bus (e.g., a Controller Area Network (CAN) or a Local Interconnect Network (LIN) protocol bus) to facilitate data input and output between the ECU 104 and the vehicle features 106.

As shown, in the exemplary embodiment, the image capturing device 110 can be a portable electronic device 110 that is operable to capture an image of the vehicle 102. The portable electronic device 110 and components that will be discussed herein can be utilized to augment the image and display virtual user interface objects (e.g., controls) atop or overlaid on vehicle features 106 identified in the image. Generally, the portable electronic device 110 of the augmented reality system 100 can be a computing device having a touch screen display 120 which enables user input (e.g., touch keyboard) and a control unit 112 for providing processing and computing functions. The portable electronic device 110 can include, but is not limited to, a handheld device, a mobile device, a smart phone, a laptop, a tablet, and an e-reader. In general, the control unit 112 is operatively connected to a camera 114, a memory 116, a communication device 118, the touch screen display 120, optionally any other input device (e.g., hard buttons, switches, a keyboard, etc.) and a plurality of sensors 122. The touch screen display 120 provides and facilitates user input and output. The touch screen display 120 can include a color LCD display which includes touch screen sensors for user input that provide touch screen functionality.

The communication device 118 of the portable electronic device 110 can include antennas and components that can be utilized for wired and wireless computer connections and communications via various protocols. The communication device 118 is capable of providing a wireless system (e.g., IEEE 802.11, IEEE 802.15.1 (Bluetooth)), a near field communication system (NFC) (e.g., ISO 13157), a local area network (LAN), a wide area network (WAN), a point-to-point system, a circuit switching system, a packet switching system, a cellular network system (e.g., CDMA, GSM, LTE, 3G, 4G), a universal serial bus, and the like.

In particular, the communications device 118 can be utilized to provide web based applications and internet resources to the user. In addition, the communications device 118 provides peer to peer (P2P) connections over to send/receive electronic signals with an external device to be utilized by software applications installed within the memory 116 of the portable electronic device 110. Accordingly, in the embodiment shown in FIG. 1, the communications device 118 of the portable electronic device 110 is utilized to provide P2P communications to send and receive electronic signals with the electronic control unit 104 of the vehicle 102 to be utilized by an augmented reality vehicle interface application 130 that resides within the memory 116 of the portable electronic device 110.

The plurality of sensors 122 can include but are not limited to an accelerometer, a magnetometer, a gyroscope, an ambient light sensor, a proximity sensor, a global positioning sensor system, a back illuminated sensor and the like. The plurality of sensors that will be discussed with reference to the components of FIG. 1 can include the magnetometer, the accelerometer, the gyroscope and the global positioning sensor system.

In the embodiment shown in FIG. 1, the functionality associated with the augmented reality system 100 is presented through the augmented reality vehicle interface application 130. The augmented reality vehicle interface application 130 enables a user to utilize the augmented reality system 100 to receive an augmented image of the vehicle 102 and the vehicle features 106 as captured by the camera 114. The augmented reality vehicle interface application 130 further enables the user to view attributes and change the settings associated with vehicle features 106 using the portable electronic device 110.

In an exemplary embodiment, the augmented reality interface application 130 is a software application that is installed directly onto the memory 116 of the portable electronic device 110. The augmented reality interface application 130 includes various modules, discussed in detail below, that are controlled and operated by the control unit 112 of the portable electronic device 110. The augmented reality interface application 130 generally processes a still or moving image of the vehicle 102 captured by the portable electronic device 110 (e.g., captured by the user), generates an augmented reality user interface 140 and displays the augmented reality user interface 140 on the display 120 for viewing and interaction by the user.

Figure 2:
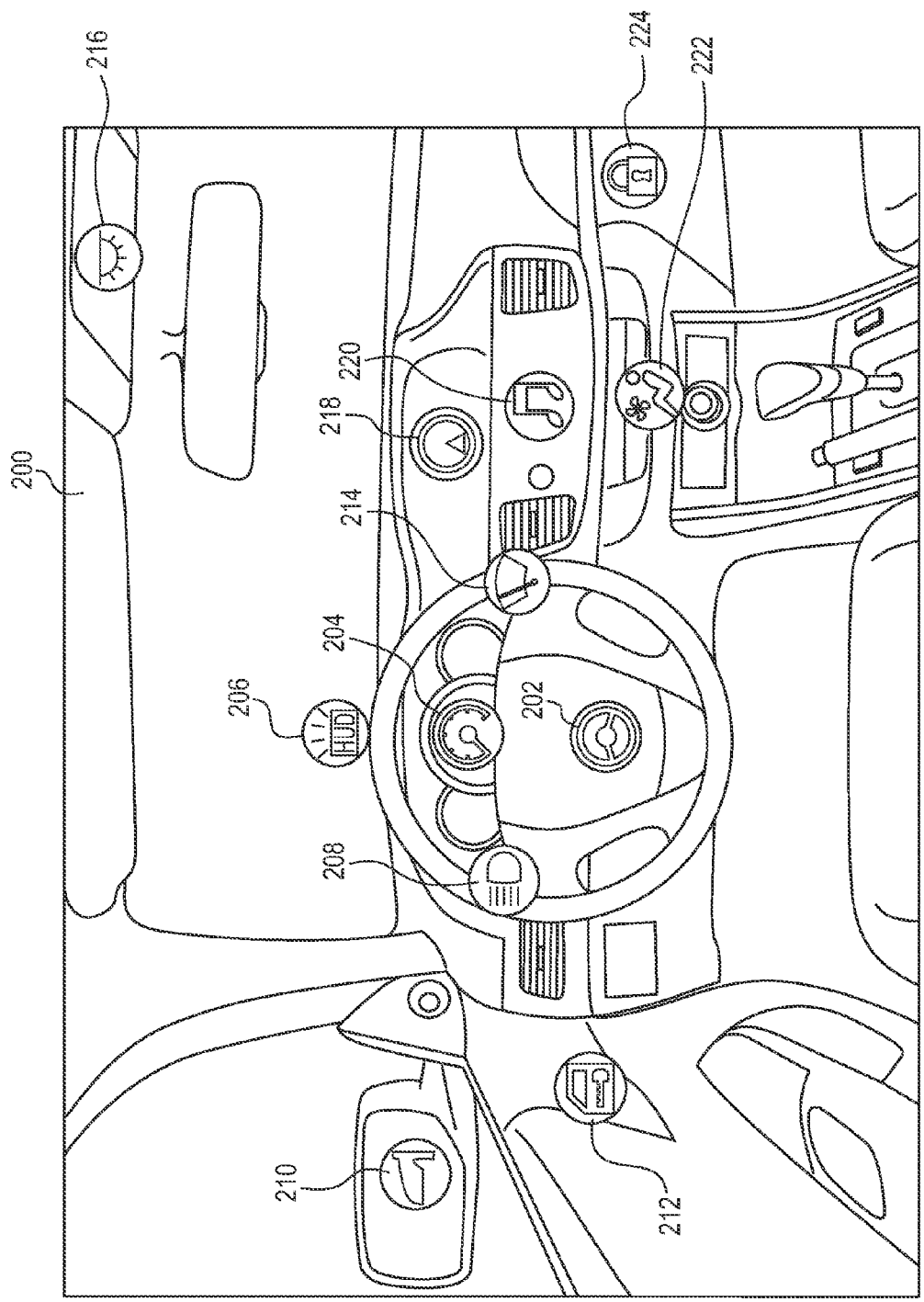
FIG. 2 a screenshot of a display of a portable electronic device from the operating environment of FIG. 1 providing an augmented reality user interface showing a driver's side perspective of the vehicle according to an exemplary embodiment.

With reference to FIG. 2, a screenshot of the touchscreen display 120 of the portable electronic device 110 providing the augmented reality user interface 200 showing a driver's side perspective of the vehicle 102 according to an exemplary embodiment is illustrated. The augmented reality user interface 200 is shown of the captured image of the vehicle 102 as augmented with virtual user interface objects (i.e., graphical input devices) that are represented by vehicle feature interface icons 202-224 overlaid upon vehicle features 106 identified in the captured image.

Referring again to FIG. 1, in another exemplary embodiment, the augmented reality interface application 130 and/or one or more of the components of the augmented reality interface application 130 can be installed externally from the memory 116 of the portable electronic device 110. For example, the augmented reality interface application 130 can include of a web based application that is accessed by the communication device 118 of the portable electronic device 110. In other embodiments, the augmented reality interface application 130 can include of a cloud based application that resides on an external host server but is accessed through a viewer application that is installed on the memory 116 of the portable electronic device 110.

The augmented reality interface application 130 can be initialized by user input of an executable icon on the touch screen display 120. Although the embodiments discussed herein discuss the augmented reality interface application 130 as an independent application, the augmented reality interface application 130 can be integrated with and/or within other vehicle 102 related software or web based applications that reside on or are accessed via the portable electronic device 110. In alternate embodiments, the augmented reality interface application 130 can be used as a plug-in/add-on to software that is utilized during operation of the camera 114 of the portable electronic device 110. As a plug-in/add-on, the augmented reality user interface 140 can be automatically enabled when the camera 114 is initialized by the user, or enabled upon the detection of a communication link between the communication device 118 and the electronic control unit 104.

Referring again to FIG. 1, upon initialization of the augmented reality vehicle interface application 130, the augmented reality user interface 130 is displayed to the user on the touch screen display 120 of the portable electronic device 110. In an exemplary embodiment, an image processing module 132 utilizes the plurality of sensors 122 along with sensors located within the vehicle 102 to determine the directional orientation and positional location of the portable electronic device 110 with respect to the vehicle 102 as the user utilizes the camera 114 to capture an image in real time. This determination provides the direction in which the portable electronic device 110 is facing with respect with the vehicle along with the position from which the portable electronic device 110 is capturing the image of the vehicle 102. An image recognition module 136 utilizes this information to determine which of the vehicle features 106 are to be included in the image being captured based on the image processing module 132 determining the directional orientation and positional location of the portable electronic device 114 within or in proximity of the vehicle 102.

The image processing module 132 utilizes the control unit 112 to access the magnetometer included within the plurality of sensors 122. The magnetometer is utilized to determine the cardinal and ordinal directional orientation and positional location of the portable electronic device 110 with respect to the vehicle 102, as described in more detail below. In one embodiment, the vehicle 102 includes an onboard digital compass (not shown) that is operably connected to the ECU 104. The image processing module 132 accesses the communication device 118 to initiate communication with the ECU 104 to determine the directional orientation and locational position of the vehicle 102 based on data provided by the vehicle 102 onboard digital compass.

Figure 3:
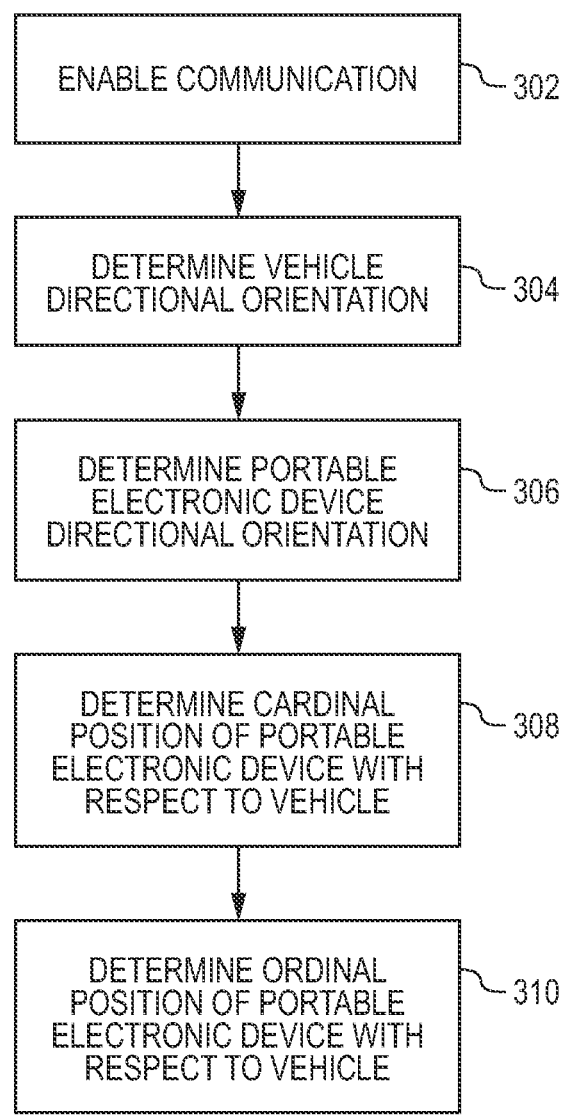
FIG. 3 is a process flow diagram of a method utilized by an exemplary embodiment of an image processing module from the operating environment of FIG. 1 according to an exemplary embodiment.

Referring now to FIG. 3, an exemplary method that can be utilized by an exemplary embodiment of the image processing module 132 is illustrated. At step 302, the communication device 118 utilizes wireless computer communications utilizing various protocols, as described above, to access the communication device of the ECU 104 within the vehicle 102 to provide P2P computer communication for exchanging information with the ECU 104. At step 304, the image processing module 132 instructs the ECU 104 to access the vehicle 102 compass to determine the directional orientation of the vehicle 102 (i.e., the direction in which the vehicle is facing). Upon determining the directional orientation of the vehicle 102, the ECU 104 relays the information to the image processing module 132. At step 306, the image processing module 132 computes the directional orientation provided by the magnetometer 122 to determine the directional orientation of the portable electronic device 110.

An illustrative example of the method shown in FIG. 3 will now be discussed in detail. In an exemplary embodiment, if the directional orientation of the vehicle 102 is determined to be north facing (as provided by the ECU 104 to the image processing module 132), and the directional orientation of the portable electronic device is determined to be north facing (as provided by the magnetometer 122 to the image processing module 132), then the image processing module 132 can determine that the user is facing north as he or she is holding the portable electronic device 110 to capture the image of the vehicle 102.

As the directional orientation of the vehicle 102 is determined, the image processing module 132 further determines the location of the portable electronic device 110 with respect to the vehicle 102. At step 308, the image processing module 132 utilizes the plurality of sensors 122 to analyze the cardinal position of the portable electronic device 110 with respect to the vehicle 102. This analysis provides the cardinal location of the user with respect to the vehicle. Referring again to the illustrative example, if the portable electronic device 110 is located a few degrees south of the north facing vehicle 102, then the image processing module 132 can determine that the user can be located within the vehicle 102. If the image processing module 132 determines that the user is located within the vehicle 102, since it is already known that the portable electronic device 110 is facing north at the time the image is being captured (at step 306), the image processing module 132 can further determine that the user is facing the front of the vehicle within the vehicle. In other words, the image processing module 132 can determine that the user is capturing an image of the front panel/dash board of the vehicle 102 as he or she is facing towards the front of the vehicle (as shown in FIG. 2). Alternatively, if the portable electronic device 110 is determined to be located a specific distance in degrees north of the front of vehicle 102, then the image processing module 132 can determine that the user is located outside and in front of the vehicle 102.

At step 310, the image processing module 132 analyzes the ordinal position of the user with respect to the vehicle 102. The image processing module 132 assigns a guidance point at a front certain portion of the vehicle 102. The portion of the vehicle 102 where the guidance point is located can vary depending on the cardinal position of the portable electronic device 110 (found in step 308). In the example provided above, if portable electronic device 110 is determined to be located south of the guidance point located at the front center portion of the vehicle 102, the image processing module 132 further analyzes if the location of the portable electronic device 110 is southeast, southwest, or directly south of the guidance point to determine the right, left, or center position of the user within the vehicle 102. Furthermore, the image processing module 132 determines how many degrees southeast, southwest, or south the portable electronic device 110 is located from the guidance point to determine if the user is located within the right, left, or center front or rear seats of the vehicle when the user is capturing the image of the vehicle 102.

Other components and methods can be utilized to determine the orientation of the vehicle 102 and portable electronic device 110, and the location of the portable electronic device 110 within or in proximity of the vehicle 102. For example, in another embodiment, the GPS sensor system included within the plurality of sensors 122 of the portable electronic device 110 is utilized in conjunction with a GPS sensor system operably connected to the ECU 104 within the vehicle 102 to triangulate and calculate the global position of the portable electronic device 110 with respect to the vehicle 102. In yet another exemplary embodiment, the GPS sensor system and the magnetometer included within the plurality of sensors 112 and the GPS sensor system and the digital compass located within the vehicle 102 can work in conjunction to determine the orientation of the vehicle 102 and the portable electronic device 110, and further triangulate the position of the portable electronic device 110 with respect to the vehicle 102.

Referring again to FIG. 1, once the determination of the orientation and location of the portable electronic device 110 with respect to the vehicle 102 is complete, the control unit 112 instructs the image processing module 132 to provide the data to a user processing module 134 and the image recognition module 136 included as part of the augmented reality vehicle interface application 130. The user processing module 134 further computes and analyzes the data provided by the image processing module 132 to determine a user classification category that is allocated to the user that is capturing the image with the camera 114 of the portable electronic device 110.

In an exemplary embodiment, the user processing module 134 categorizes the user as a 'driver' or a 'passenger' of the vehicle 102. In other embodiments, additional classifications can be designated for the user (e.g., front seat passenger, left hand side rear passenger, right hand side rear passenger, etc.) Further, several sub classifications can also be designated for the user from data provided by the ECU 104 based on the utilization of additional sensors or systems within the vehicle 102 (e.g., adult/child passenger).

In the example provided above, if the image processing module 132 determines that, based on the positional location of the portable electronic device 110 when capturing the image of the vehicle 102, the user is located in the front driver side seat, the user processing module 134 designates the user as a 'driver'. Similarly if the image processing module 132 determines the user to be located in a passenger front or rear seat, the user processing module 134 designates the user as a 'passenger'.

As discussed above, once the determination of the directional orientation and cardinal and ordinal location of the portable electronic device 110 and consequently the user capturing the image is located with respect to the vehicle 102 is complete, the image processing module 132 provides the data to the image recognition module 136. In one embodiment, the image recognition module 136 utilizes this data to locate vehicle features 106 and classifies them as points of interest that are being captured by the camera 114 as its being pointed toward portions of the vehicle 102. The points of interest are specific points within the captured image that correspond to vehicle features 106 that can be augmented within the real image of the vehicle 102 by a virtual reality module 138, as discussed in more detailed below.

Based on the directional and positional information, the image recognition module 136 detects vehicle features 106 that are designated as points of interest within the image of the portion of the vehicle 102 as its being captured and changing in the direction that the user pans the portable electronic device 110. Additionally, once the directional and positional data is analyzed, the position of points of interest that are in vicinity of the points of interest being captured within the image are determined to allow for efficient augmenting while the user continues to pan the portable electronic device 110 to capture different areas of the vehicle 102 with the camera 114.

In another exemplary embodiment, the points of interest are analyzed and determined within portions of the image of the vehicle 102 by determining the location of a predetermined marker within the image. The image processing module 132 determines that the image is of a portion of the vehicle 102. The image processing module 132 accesses vehicle logic (not shown) located within the memory 116 that includes vehicle imagery data. The control unit 112 determines that the captured image is of the vehicle 102 by comparing the captured image data to the vehicle imagery data. As the image of the vehicle 102 is captured by the camera 114, the image recognition module 136 accesses the vehicle logic and the control unit 112 determines the position of the predetermined marker that is located within the image based on the vehicle logic.

Once the predetermined marker is positioned, the image recognition module 136 determines the specific orientation (i.e., portrait, landscape) of the portable electronic device 110 by utilizing the gyroscope and accelerometer that are included within the plurality of sensors 122. This determination can take place by calibrating and identifying the points of interest based on the location of the predetermined marker as a focal point within the image. The image recognition module 136 continues to identify the points of interest by determining the specific orientation of the portable electronic device 110 itself as the user moves the portable electronic device 110 around. As an illustrative example, as the user is positioning the camera to capture a moving image of different areas of the vehicle 102, the points of interest are identified by the image recognition module 136 respective to the predetermined marker. For example, the position of the predetermined marker can be detected within the vehicle logic data to be at the center of the steering wheel of the vehicle 102. Once the user captures an image of the front panel of the vehicle 102, the image recognition module 136 accesses the vehicle logic (located within the memory 116) and determines the location of the predetermined marker within the image.

Referring again to the illustrative example, once the predetermined marker is found at the center of the steering wheel, the image recognition module 136 can calibrate and identify the points of interest based on their position relative to the center of the steering wheel. This determination can depend on the specific orientation of the portable electronic device 110 as provided by the gyroscope and accelerometer as the portable electronic device 110 is being panned to capture images around the vehicle 102. Consequently, as the portable electronic device 110 is moved, the image of the vehicle 102 can change, causing the incorporation of additional points of interest to be included within the image.

Once the points of interest (i.e., vehicle features 106) are located and identified within the image, the control unit 112 instructs the image recognition module 136 to provide the located points of interest data to the virtual reality module 138. The virtual reality module 138 computes and analyzes the image recognition and user classification data and associates virtual user interface objects to each identified point of interest. The virtual reality module 134 can associate virtual user interface objects to areas within the image wherein a point of interest is not found, as will be discussed below.

Referring back to FIG. 2, as the virtual reality module 138 associates virtual user interface objects to points of interest located and identified within the image, the control unit 112 augments the real image captured by the user by overlaying the virtual user interface objects atop the points of interest as shown. In an exemplary embodiment, the virtual user interface objects are descriptive vehicle feature interface icons that correspond to the vehicle features 106 identified as points of interest within the image.

As shown in FIG. 2, the image captured by the user utilizing the camera 114 is augmented with the vehicle feature interface icons 202-224 and shown on the touch screen display 120 as the augmented reality user interface 200. As the user pans the portable electronic device 110, the specific orientation of the portable electronic device 110 can be determined as provided by the gyroscope and accelerometer (included within the plurality of sensors 122). The orientation data can be communicated to the image recognition module 136, and virtual reality module 138. As the specific orientation of the device changes, the image captured by the camera 114 can change and additional points of interest can come into view on the touch screen display 120.

The virtual reality module 138 can apply vehicle feature interface icons accordingly to the points of interests that correspond to the vehicle features 106 that can fall into the image to be shown on the augmented reality user interface 140. As discussed in detail below, in some embodiments the virtual reality module 138 can apply the vehicle feature interface icons based on the location of the user within the vehicle.

Figure 4:
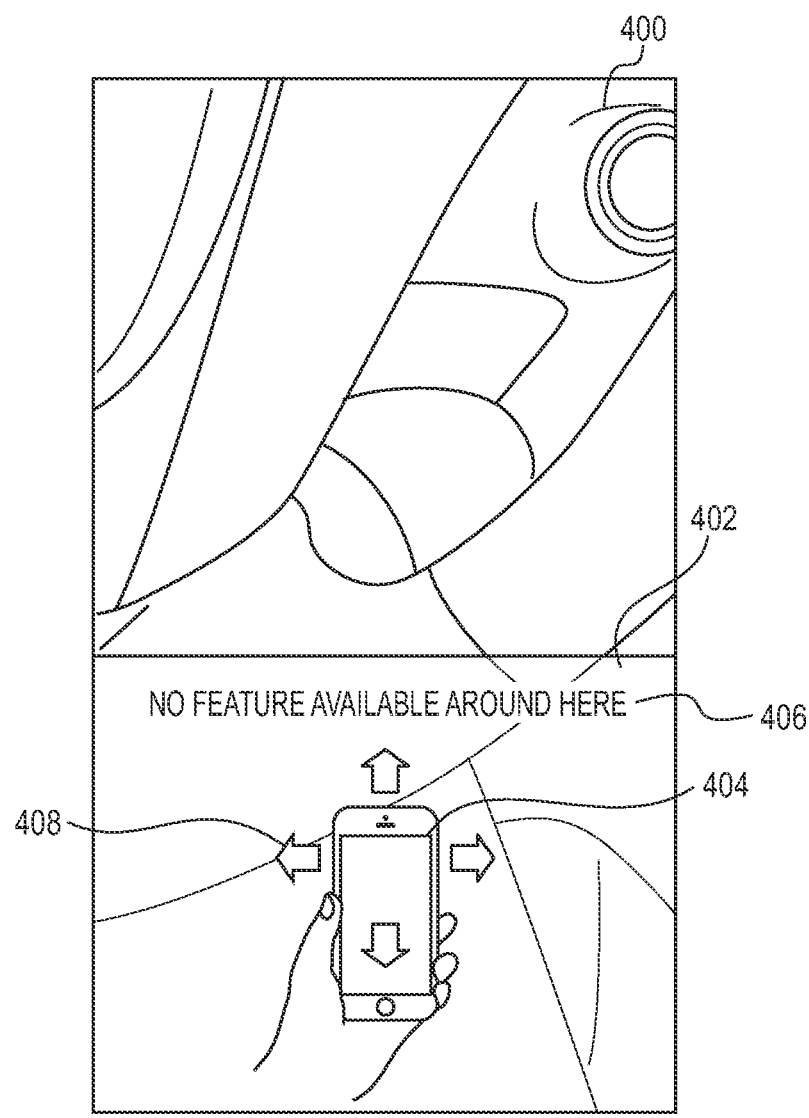
FIG. 4 is a screenshot of the display of the portable electronic device of FIG. 1 providing an augmented reality user interface showing an area where no vehicle features are found according to an exemplary embodiment.

In an exemplary embodiment, if the user pans the portable electronic device 110 to capture an image over a portion of the vehicle 102 that is not identified as a vehicle function 106 that constitutes as a point of interest (as provided by the image recognition module 136), the virtual reality module 138 provides a virtual object which alerts the user that no feature is found in the area. FIG. 4 shows an exemplary screenshot of the touchscreen display 120 of the portable electronic device 110 providing an augmented reality user interface 400 showing an area 402 where no vehicle features are found. As illustrated, the augmented reality user interface includes an illustration 404 and an alert message 406 that alerts the user as soon as the user pans to the area 402 of the vehicle 102 that does not include a point of interest. In an alternate embodiment, in addition to an alert message 406, the illustration 404 can additionally include a directional symbol 408 which directs the user to pan the portable electronic device 110 towards the nearest point of interest. In an additional embodiment, the virtual reality module 138 can not provide any virtual image if a point of interest is not captured within the image. For example, only portions where points of interest are found within the image would be shown as augmented on the touch screen display 120.

With reference back to FIG. 2, the vehicle feature interface icons 202-224 associated with the points of interest can be selected by the user by utilizing touch inputs that are associated with each of the vehicle feature interface icons 202-224. The vehicle feature interface icons 202-224 can be touch inputted by the user to provide characteristics that are associated with corresponding vehicle features 106. In one embodiment, once one of the vehicle feature interface icons is touch selected by the user on the touch screen display 120, the virtual reality module 138 can overlay a current status (e.g., dome light on door mode, tire pressure low) regarding the vehicle feature 106 associated with the vehicle feature interface icon that is selected.

In one embodiment, the virtual reality module 138 can overlay data from the owner's manual of the vehicle 102. Specifically, if the user touch inputs one of the vehicle feature interface icons provided on the augmented reality user interface 140, the virtual reality module 138 accesses the memory 116 to gather the vehicle 102 owner's manual data corresponding to the model of the vehicle 102 (as provided by the ECU 104) to be displayed on the augmented reality user interface 140. In an alternate embodiment, the virtual reality module 138 can utilize the communication device 118 to access an external server to gather the vehicle 102 owner's manual data to be displayed within the augmented reality user interface 140.

Figure 5A:
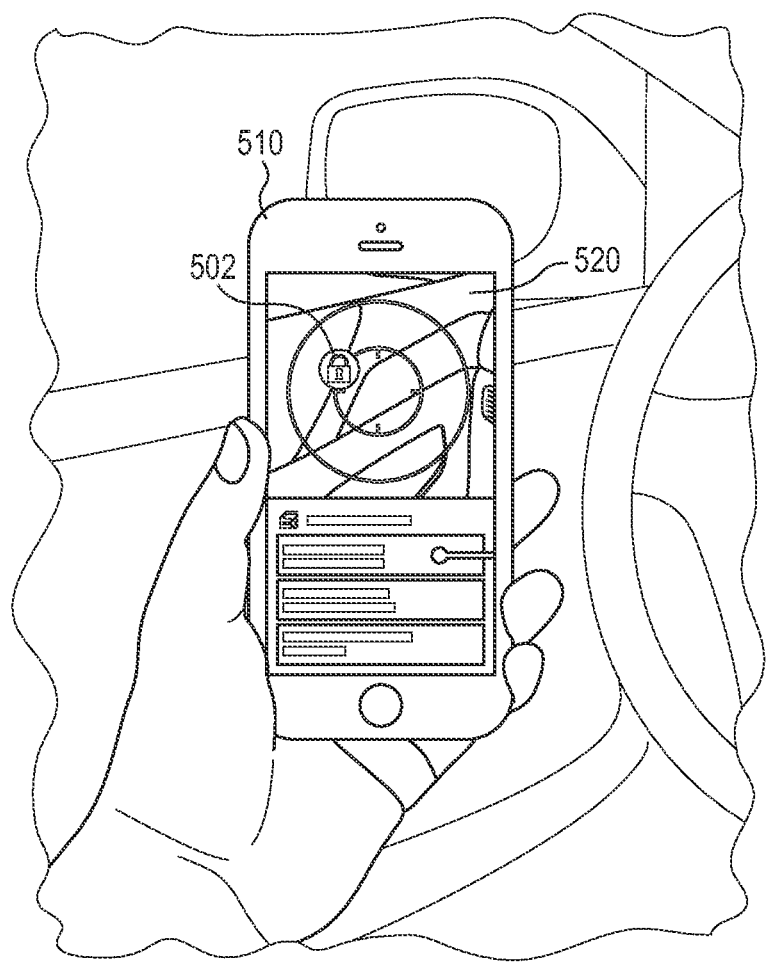
FIG. 5A is an illustration of the portable electronic device of FIG. 1 in possession of a user according to an exemplary embodiment.
Figure 5B:
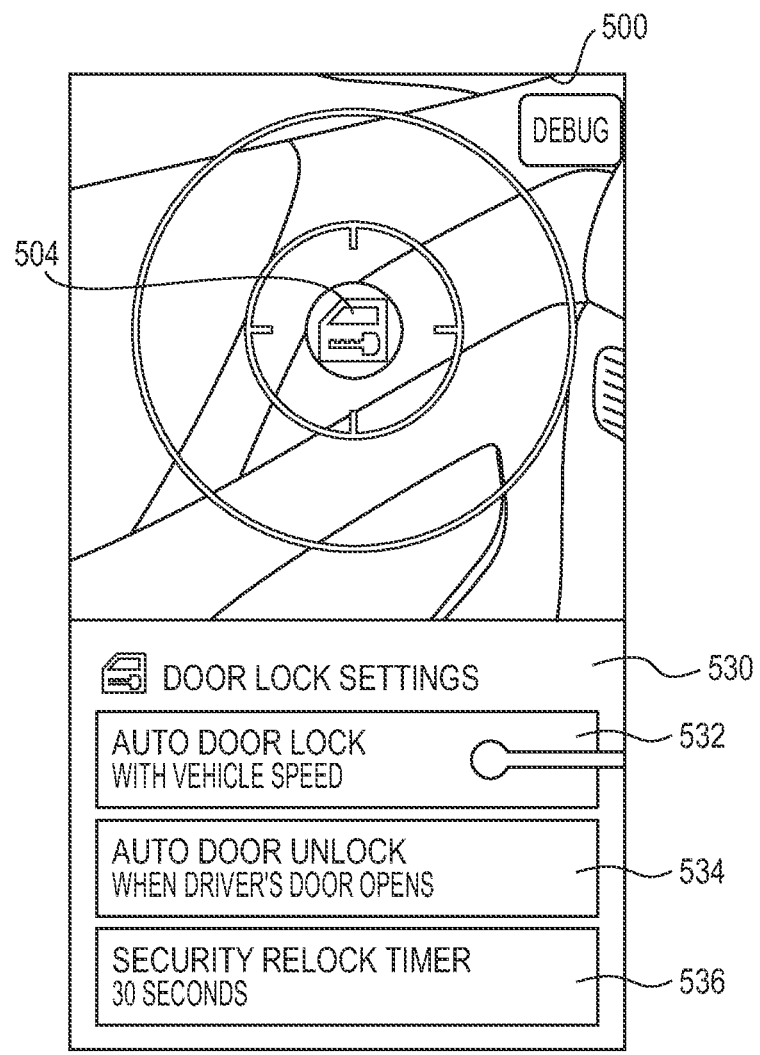
FIG. 5B is a screenshot of a display of the portable electronic device of FIG. 1 providing an augmented reality user interface showing a vehicle feature settings menu relating to the driver's side door lock settings according to an exemplary embodiment.

FIG. 5A shows an illustration of the portable electronic device 510 in possession of the user as the user is capturing the driver side door lock 502 (using the camera 114) within the image that is displayed on the touch screen display 520. In an exemplary embodiment of the augmented reality user interface 500, shown in a screenshot of the touchscreen display 510 shown in FIG. 5B, the driver side door lock 502 (See FIG. 5A) is shown as augmented with the corresponding vehicle feature interface icon 504. FIG. 5B additionally shows a vehicle feature settings menu 530 relating to the driver's side door lock 502 settings.

The vehicle feature settings menu can be shown along with the vehicle feature settings icons that include various types of settings and characteristics based on the user input of the vehicle feature interface icon. Generally, the type of content data displayed within the vehicle feature settings menu icons on the vehicle feature settings menu includes but is not limited to settings options, current settings data, current characteristics, etc. that are tied to the operation and functionality of the corresponding vehicle feature 106 being identified as a point of interest. For example, in FIG. 5B, the door lock settings menu 530 (vehicle feature settings menu relating to the driver's side door lock 502 settings) includes door lock settings menu icons 532-536 (vehicle feature settings menu icons related to the driver's side door lock 502 settings) that include various settings and characteristics that correspond to the door lock 502 settings. In an alternate embodiment, if the image recognition module 136 senses that the user is maintaining the camera 114 onto a particular point of interest, such as the driver's side door lock 502, for a predetermined amount of time, the virtual reality module 138 can automatically provide the corresponding (door lock) vehicle feature interface icon 504 and the door lock settings menu 530 to be displayed within the augmented reality user interface 500.

In one embodiment, upon initialization of the augmented reality vehicle interface application 130, the virtual reality module 138 utilizes the communication device 118 to access settings and content data from the vehicle 102 relating to all vehicle features 106 that correspond to points of interest. The ECU 104 typically stores or accesses the settings and content data for each vehicle feature 106. Therefore, the communication device 118 communicates with the ECU 104, in a manner as described above, to access this data and provide the data to the virtual reality module 138 to populate the content data displayed on the vehicle feature settings menu.

In an alternate embodiment, the virtual reality module 138 can utilize the communication device 118 to communicate with the ECU 104 once the vehicle feature settings menu is initialized to appear on the augmented reality user interface 140. The virtual reality module 138 utilizes the communication device 118 to only access the settings and content data that are related to vehicle features 106 that are identified as points of interests being captured within the image. In response, the communication device 118 communicates with the ECU 104 to access this data and the ECU 104 accesses and provides data only for the points of interest that are being captured within the image to be shown accordingly within the vehicle feature settings menu on the augmented reality user interface 140.

Figure 6A:
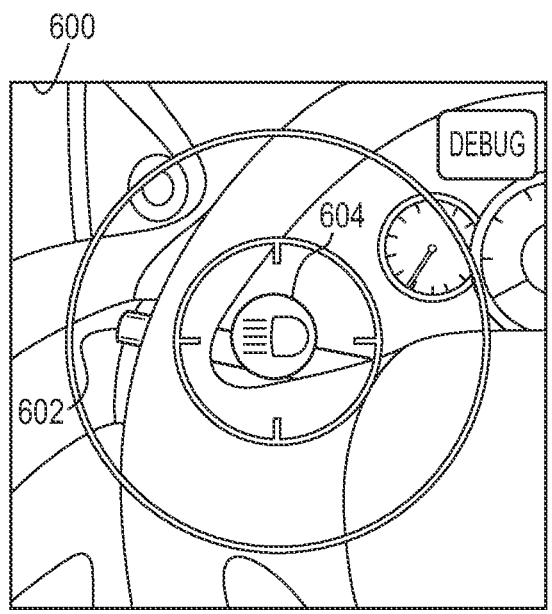
FIG. 6A is a screenshot of a display of the portable electronic device of FIG. 1 providing an augmented reality user interface showing a vehicle feature interface icon relating to the driver's side lighting controls according to an exemplary embodiment.
Figure 6B:
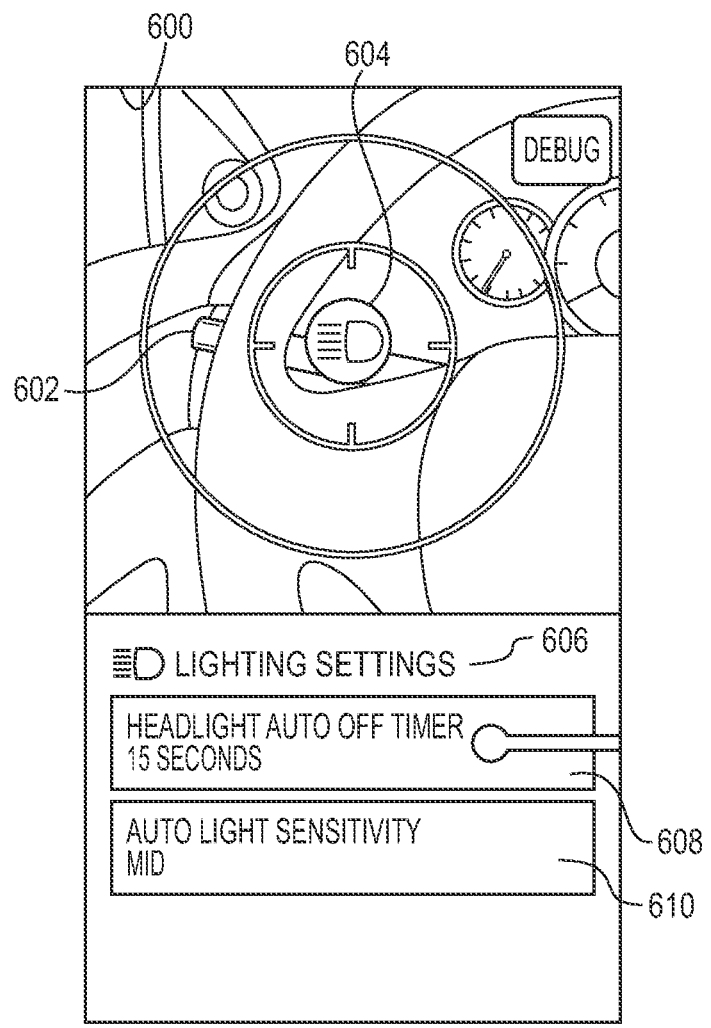
FIG. 6B is a screenshot of a display of the portable electronic device of FIG. 1 providing an augmented reality user interface showing a vehicle feature settings menu relating to the driver's side lighting controls according to an exemplary embodiment.
Figure 6C:
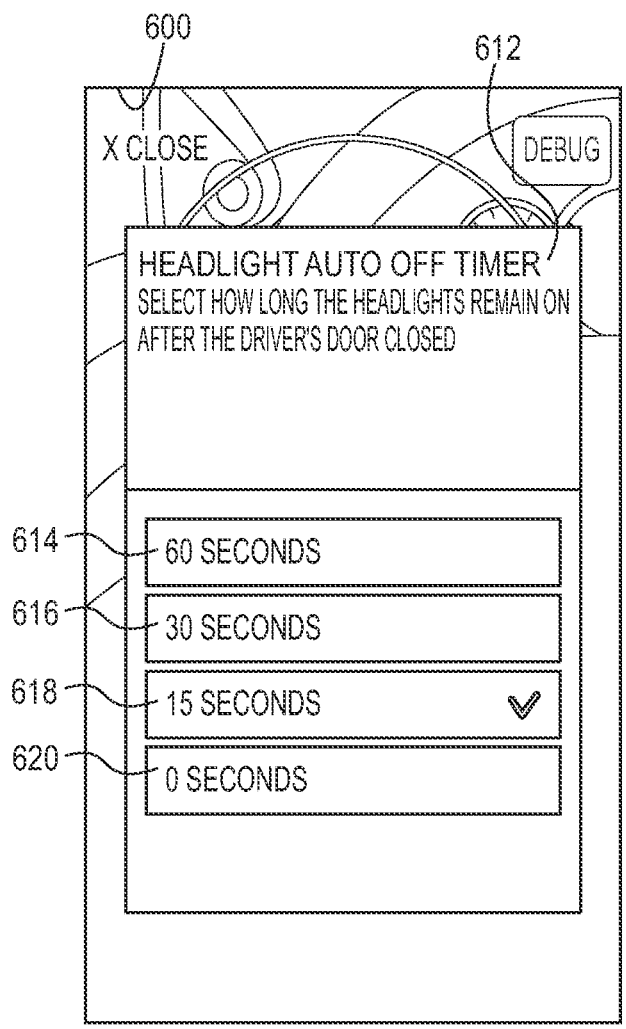
FIG. 6C is a screenshot of a display of the portable electronic device of FIG. 1 providing an augmented reality user interface showing a vehicle feature settings sub-menu relating to the driver's side lighting controls according to an exemplary embodiment.

FIG. 6A-6C shows a series of screenshots of the touch screen display 120 of the portable electronic device 110 providing the augmented reality user interface 600. FIG. 6A shows a screenshot of the touch screen display 120 of the portable electronic device 110 providing the augmented reality user interface 600 showing the driver's side lighting control 602 overlaid with a vehicle feature interface icon 604 that is provided by the virtual reality module 138 upon the user's capturing an image of the driver's side lighting control 602.

FIG. 6B shows a screenshot of the touch screen display 120 of the portable electronic device 110 providing the augmented reality user interface 600 showing vehicle feature settings menu 606 relating to the driver's side lighting control 602. As similarly discussed above in relation to the vehicle 102 driver's side door lock settings, the corresponding lighting system settings menu 606 (vehicle feature settings menu relating to the driver's side lighting control 602) is displayed in relation to the lighting system upon receiving the user's input on the lighting system interface icon 604 (vehicle feature interface icon relating to the driver's side lighting control 602). The lighting system settings menu icons 608, 610 (vehicle feature settings menu icons relating to the driver's side lighting control 602), are accordingly provided and displayed for the user utilizing the augmented reality user interface 600.

Each of the vehicle feature settings menu icons is attributed to a different characteristic of the corresponding vehicle feature. For example, as shown in FIG. 6B, the lighting system settings menu icons 608, 610 correspond to a selection of settings related to different aspects of the lighting system (e.g., head light auto timer, auto light sensitivity). As discussed above, the virtual reality module 138 utilizes the communication device 118 to communicate with the ECU 104 to obtain settings data relating to the associated vehicle feature 106. The virtual reality module 138 populates the settings related data within the vehicle feature settings menu icons to be presented for the user as input icons. For example, as shown, the ECU 104 provides time settings data regarding the headlight auto off timer as currently set at 15 seconds that is displayed within the lighting system settings menu icon 608.

The user can touch input the vehicle feature settings menu icons for any corresponding vehicle feature augmented within the captured image, and a corresponding vehicle feature settings sub-menu with a description of the setting to be viewed or changed shall appear. Generally, the vehicle feature settings sub-menu includes one or more vehicle feature settings sub-menu icons associated with the specific setting of an associated vehicle feature 106. The settings options are options relating to characteristics, operations, timing, and details associated with the use of corresponding vehicle features 106. The settings options are individually displayed within the vehicle feature settings sub-menu icons to be touch inputted for selection by the user.

FIG. 6C shows a screenshot of the touch screen display 120 of the portable electronic device 110 providing the augmented reality user interface 600 showing the vehicle feature settings sub-menu 612 relating to the driver's side lighting control 602. The user can change the settings shown on the touch screen display 120 by touch inputting the lighting system settings menu icons 608, 610 (See FIG. 6B). With reference to FIGS. 6B and 6C, upon receiving an input on one of the lighting system settings menu icons 608, 610, the corresponding lighting system settings sub-menu 612 (vehicle feature settings sub-menu relating to the driver's side lighting control 602) is displayed. Each of the settings options are displayed in lighting system sub-menu settings icons 614-620 (vehicle feature settings sub-menu icons relating to the driver's side lighting control 602) that are touch input selectable icons that can be utilized to change or confirm a setting associated with the lighting system.

The vehicle feature settings sub-menu icons are populated by the virtual reality module 138 in various manners. In one embodiment, the virtual reality module 138 utilizes the communication device 118 to communicate with the ECU 104 to populate each of the vehicle feature sub-menu settings icons. In another embodiment, the ECU 104 stores the settings options associated with each vehicle feature 106 within internal memory. In an alternate embodiment, when the ECU 104 communicates with vehicle features 106 to determine current settings, as described above, the settings options associated with vehicle features 106 can also be provided. In an additional embodiment, settings options associated with vehicle features can reside in a vehicle profile within the memory 116 of the portable electronic device 110. The virtual reality module 138 accesses the settings data and accordingly populates the vehicle feature settings sub-menu icons. For example, as shown in FIG. 6C, the headlight auto off timer settings are populated and displayed within lighting system settings sub-menu icons 614-620 as provided by the virtual reality module 138.

The vehicle feature settings sub-menu icons can be selected by the user to confirm or change settings options associated with a corresponding vehicle feature 106. If a user decides that the current setting is still desired, the user can touch input the corresponding vehicle feature settings sub-menu icon to confirm the setting. Conversely, if the user chooses to change the current setting, the user can touch input one of the other desired settings options provided within corresponding vehicle feature settings sub-menu icons to change the setting associated with the corresponding vehicle feature 106. For example, as shown in FIG. 6C, the user can choose to input the lighting system settings sub-menu icon 618 for '15 seconds' to keep the current headlight auto off timer as shown on the previously inputted lighting system settings menu icon 608. On the other hand, the user can choose to input the '60 seconds' lighting system sub-menu icon 614 to change the timer setting for the headlight auto off timer from 15 seconds to 60 seconds.

In another exemplary embodiment, the virtual reality module 138 can populate the vehicle feature settings sub-menu with a user customizable vehicle feature settings sub-menu icon in addition to the vehicle feature settings sub-menu icons that provide the user with pre-determined settings options can enable the user to type in a setting if the user wants to utilize a setting that is not displayed as a settings option or customize a setting according to the users own preference. For example, with reference back to FIG. 6C, if the user does not wish to utilize a predetermined settings option for the headlight auto off timer on the lighting system settings sub-menu 612, the user can type in his or her own preference within the user customizable lighting system settings sub-menu icon (not shown) that can be implemented by the ECU 104.

The virtual reality module 138 can provide a description of a range of user customizable settings that can be implemented within the user customizable vehicle feature settings sub-menu icon. For example, within the user customizable vehicle feature settings sub-menu icon, there can be a description that the user can only input timing settings related to the headlight auto off timer that are between 0 and 180 seconds. Accordingly, the settings associated with the headlight auto off timer can only change if the user types in an option within the range as detailed.

Upon receiving the user input on the vehicle feature settings sub-menu icon on the augmented reality user interface 140, the control unit 112 utilizes communication device 118 to communicate the settings options change to the ECU 104. In one embodiment, the ECU 104 sends a signal to the corresponding vehicle feature 106 that communicates the change in settings to be implemented with respect to the vehicle feature 106. In an alternate embodiment, the ECU 104 stores changed vehicle settings within internal (ECU 104) memory to be implemented upon use of the vehicle feature 106. Once the ECU 104 registers this change, the changed settings are saved (within the ECU 104 and within the memory 116) and utilized as the current settings (by the virtual reality module 138) that are shown to the user within the corresponding vehicle feature settings menu icon within the vehicle feature settings menu.

In an exemplary embodiment, certain points of interest can vary for the driver as opposed to the passengers. Additionally, settings and content data that are displayed on the vehicle feature settings menu and/or the vehicle feature settings sub-menu for some of vehicle features 106 can also vary for a driver as opposed to a passenger. However, there can still be many vehicle features 106 that are identified as points of interest with identical settings regardless of the type of user. In many instances, this functionality of assigning specific points of interests/settings to drivers and passengers can ensure the safety of occupants within the vehicle 102, so as to ensure that the passenger does not have influence over critical driver related vehicle features 106, and to further safeguard against unnecessary driver distraction.

Figure 7:
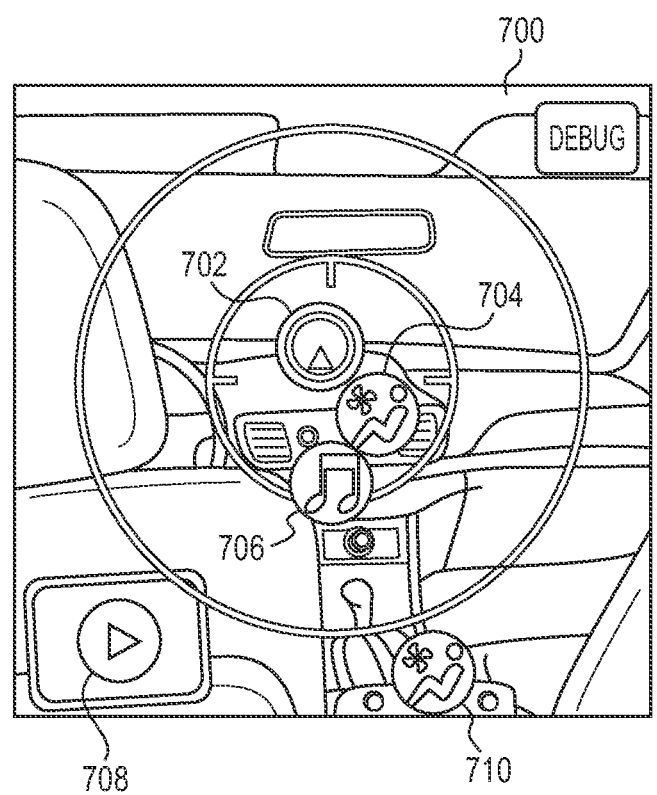
FIG. 7 is a screenshot of a display of the portable electronic device of FIG. 1 providing an augmented reality user interface from a rear passenger's perspective according to an exemplary embodiment.

For example, as shown in FIG. 7, a screenshot is shown of the touch screen display 120 of the portable electronic device 110 providing the augmented reality user interface 700 from a rear passenger's perspective according to an exemplary embodiment. As shown, when the passenger is operating the portable electronic device 110 to capture an image of the vehicle 102 from the rear seat of the vehicle 102 as shown, the image can include points of interest that are overlaid with vehicle feature interface icons 702-710 that only appear from the passenger's perspective, as oppose to the driver's perspective (as shown in FIG. 2). In certain circumstances, there can be certain vehicle features 106 that include specific settings options that are only attributed to the driver or the passenger. For example, certain vehicle features 106 can include different settings that are only attributed to passengers (e.g., passenger front/rear climate control settings) as oppose to drivers (e.g., driver's climate control settings) and accordingly displayed on the vehicle feature settings icons and/or vehicle feature settings sub-menu icons specifically for a driver versus a passenger.

More specifically, the control unit 112 instructs the user processing module 134 to provide the user classification category data to the virtual reality module 138 as the user is capturing the image of the vehicle 102. The virtual reality module 138 computes and analyzes the user classification category data to determine if a virtual user interface object should be overlaid atop specific points of interests that relate to a driver versus a passenger. In addition, the virtual reality module 138 utilizes the communication device 118 to access settings and content data from the vehicle 102 that are related to the corresponding user classification category for those points of interest that include different settings for the driver versus the passenger. The ECU 104 provides data regarding the certain vehicle features 106 that specifically correspond to the user classification category (i.e., for a driver or a passenger). This data is translated by the virtual reality module 136 to provide vehicle feature interface icons, vehicle feature settings menus, and vehicle feature settings sub-menus on the augmented reality user interface 140 that corresponds to either or both the driver or passenger.

The user processing module 134 can utilize other techniques to determine the user classification category of the user. In an alternate embodiment, the augmented reality vehicle interface application 130 includes an option at login for a user to select if he or she is a driver or type of passenger. In yet another embodiment, the augmented reality virtual user interface application 130 can include a user profile that is utilized to determine the user classification category for the user. The user profile can be specifically tied to a user ID that is associated with the specific user and vehicle 102. Within the user profile, the user can characterize themselves as a driver or passenger of the specific vehicle 102. In yet another embodiment, the user profile can be tied to a third party vehicle 102 application that determines the user classification category. The augmented reality vehicle interface application 130 utilizes the communication device 118 to download the user profile from the third party vehicle 102 application to determine the user classification category.

Figure 8A:
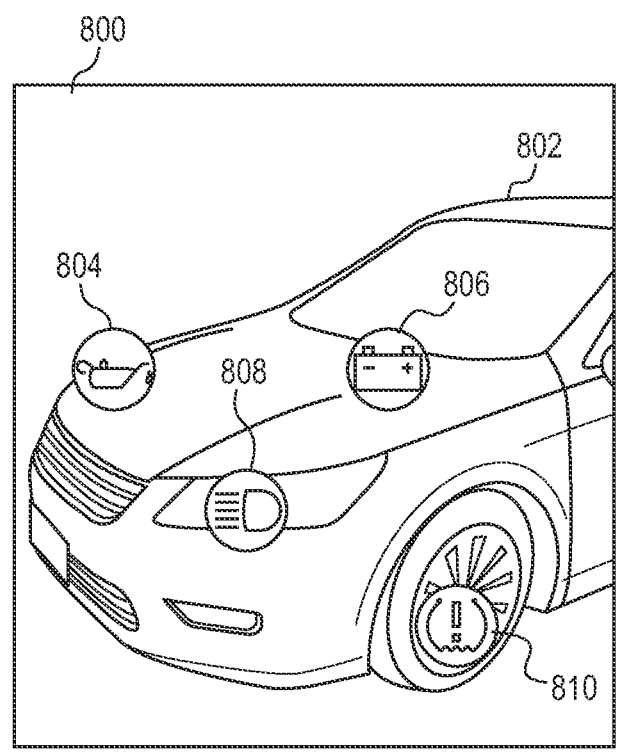
FIG. 8A is screenshot of a display of the portable electronic device of FIG. 1 providing an augmented reality user interface showing the exterior portion of the vehicle according to an exemplary embodiment.

In many instances there are vehicle features 106 that can provide identical settings regardless of the user classification category. In such circumstances, the virtual reality module provides vehicle feature settings menus and vehicle feature settings sub-menus that are neither specifically associated to a driver or passenger. In some cases, these vehicle features 106 are located outside the vehicle 102 and are identified as points of interest by the image recognition module 136 to be further augmented by the virtual reality module 138. For example, FIG. 8A shows a screenshot of a display of the portable electronic device 110 providing an augmented reality user interface 800 showing the exterior portion of a vehicle 802, as captured by a user (not shown) in close proximity of the vehicle 802. As shown, the virtual reality module 138 provides vehicle feature interface icons 804-810 that are allocated to points of interest that can be captured within the image as exterior vehicle features 106, or vehicle features 106 associated to accessories/systems located under the hood of the vehicle 102. These vehicle feature interface icons 804-810 can selected by the user by touch input to manipulate associated settings similar to the exemplary interior vehicle features 106 discussed above.

Figure 8B:
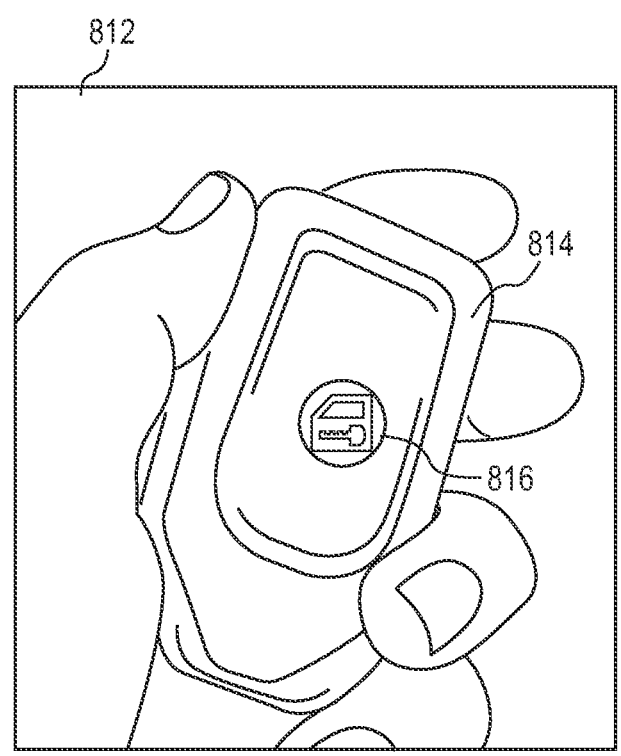
FIG. 8B is screenshot of a display of the portable electronic device of FIG. 1 providing an augmented reality user interface showing the key fob of the vehicle according to an exemplary embodiment.

Vehicle features 106 that are associated with external vehicle features 106 can also be recognized by the image recognition module 136 as a point of interest. For example, FIG. 8B, shows a screenshot of a display of the portable electronic device 110 providing an augmented reality user interface 812 showing the key fob 814, as captured by the user on the portable electronic device 110. The key fob 814 is shown as augmented by the virtual reality module 138 to provide virtual user icon 816 on the augmented reality user interface 810. The virtual user interface icon 816 can be selected to provide settings options relating to the key fob 812. It is to be appreciated that various vehicle components and subsystems that are not specifically discussed herein but are included internally and externally to the vehicle 102 can be detected as points of interest by the image recognition module 136.

Figure 9:
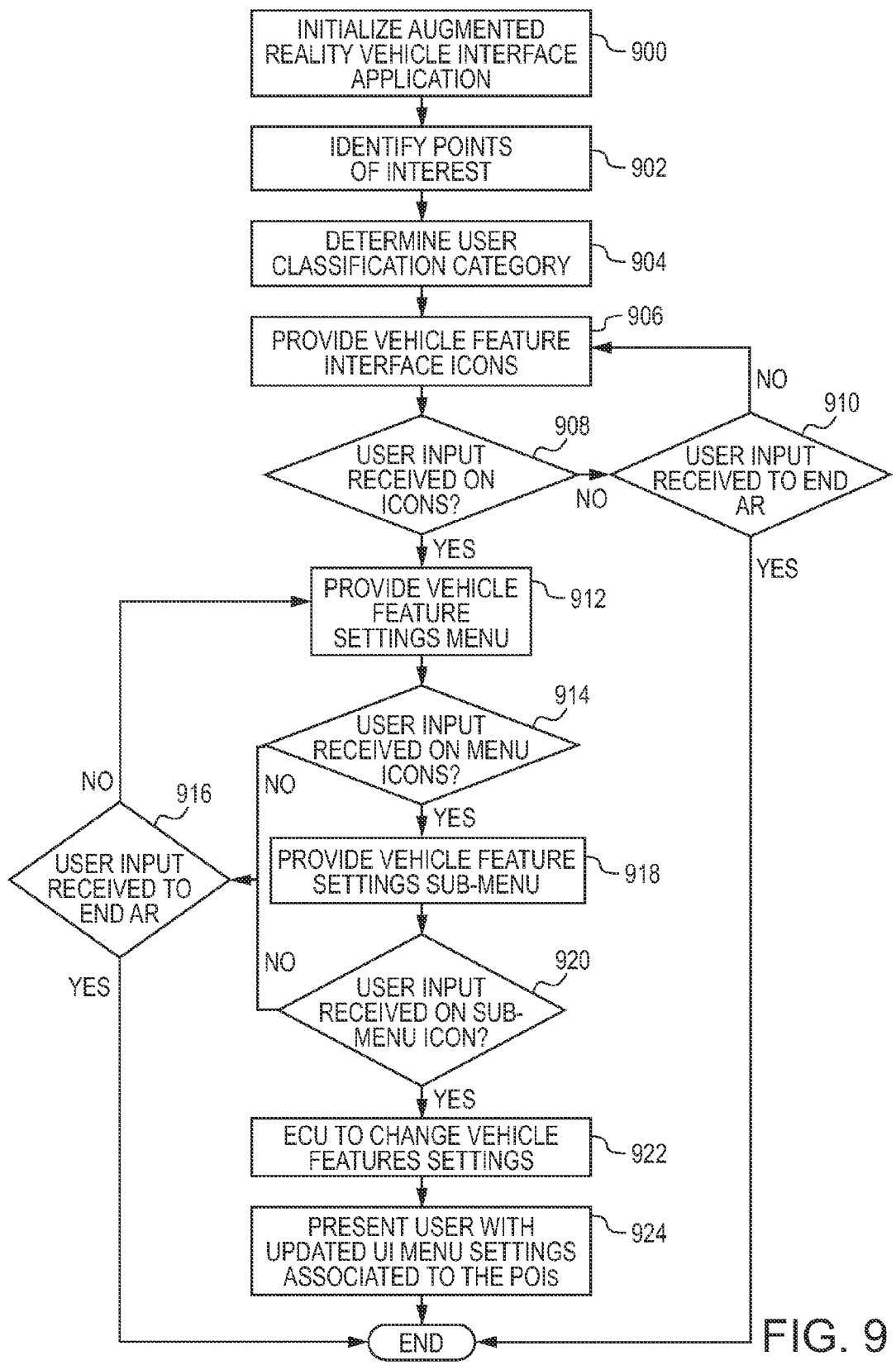
FIG. 9 is a process flow diagram of a method for providing an augmented reality vehicle interface according to an exemplary embodiment.

The augmented reality interfaced system illustrated in FIGS. 1-8 will now be described in operation with reference to a method of FIG. 9. The method includes at step 900, initializing the augmented reality vehicle interface application 130. The augmented reality vehicle interface application 130 can be initialized by the user utilizing the camera 114 of the portable electronic device 110 to capture an image. Once the image is captured, the control unit 112 utilizes vehicle logic stored within memory 116 to identify that the image is of a portion of the vehicle 102. The image processing module 132 utilizes various techniques, as discussed above, to determine the orientation and location of the portable electronic device 110 with respect to the vehicle 102. Once this determination is complete, at step 902, points of interest are identified within the image. The image recognition module 136 utilizes various means, as discussed above, to identify vehicle features 106 that are being captured within the image of the vehicle 102. The image recognition module 136 further identifies the vehicle features 106 that are predetermined as points of interest within the image.

At step 904, the determination is made as to the user classification category of the user that is capturing the image of the vehicle 102 using the portable electronic device 110. In an exemplary embodiment, as described in detail above, the user processing module 134 utilizes the locational data provided by the image processing module 132 to determine the user classification category of the user. The user processing module 134 provides the user classification category and sends the data to the virtual reality module 138. At step 906, the virtual reality module 136 provides vehicle feature interface icons that correspond to the points of interest that are identified within the image of the vehicle 102. The virtual reality module 136 augments the image captured by the user by overlaying the vehicle features 106 with the vehicle feature interface icons. The augmented image is displayed on the augmented reality user interface 140 which enables the user to select and input the vehicle feature interface icons.

Once the user is presented with the augmented reality user interface 140, it is determined at step 908 if the user has inputted any of the vehicle features icons. For example, the input can include a touch input of one of the vehicle features icons on the touch screen display 120 and/or a fixed view on the point of interest that is interpreted by the augmented reality user interface 140 to be an input. If the determination is made that an input has not been received, a subsequent determination is made at step 910 if the user input to end the augmented reality vehicle interface application 130 occurs to either end the augmented reality system 100 processes or to continue to provide vehicle feature interface icons (at step 906). Alternatively, if the determination is made that an input has been received, at step 908, the virtual reality module 138 provides the vehicle features settings menu at step 912, that is associated with the vehicle features interface icon augmented atop the vehicle feature 106. As described above, the vehicle features settings menu is populated with user input based vehicle feature settings menu icons that provide vehicle data regarding vehicle feature 106 settings and characteristics.

Once the user is presented with the vehicle feature settings menu, it is determined at step 914 if the user has inputted any of the vehicle feature settings menu icons. If the determination is made that an input has not been received, a subsequent determination is made at step 916 if the user input is received to end the augmented reality vehicle interface application 130 or to continue to provide the vehicle features settings menu (at step 912). Alternatively, if the determination is made that an input has been received (at step 914), the virtual reality module 138 provides the vehicle feature settings sub-menu that is associated with the vehicle feature interface icon augmented atop the vehicle feature 106 at step 918. As described above, in an exemplary embodiment, the vehicle feature settings sub-menu contains vehicle feature settings sub-menu icons that provide settings selections associated with corresponding vehicle features 106. The user can utilize the vehicle feature settings sub-menu icons to change settings or characteristics associated with the corresponding vehicle function 106.

At step 920, it is determined if the user has inputted any of the vehicle feature settings sub-menu icons of the vehicle feature settings sub-menu. If the determination is made that an input has not been received, a subsequent determination is made at step 916 if the user input is received to end the augmented reality vehicle interface application 130 occurs or to continue to provide the vehicle features settings menu (at step 912). Alternatively, if the determination is made that an input has been received, at step 922 the augmented reality vehicle interface application 130 utilizes the communication device 118 to communicate the settings change to the ECU 104.

As described in detail above, the ECU 104 is operably connected to the vehicle features 106 and can manipulate the settings with the corresponding vehicle feature 106 as per the user's input of the vehicle feature settings sub-menu icon on the augmented reality user interface 140 (at step 920). Once the ECU 104 manipulates the setting associated with the corresponding vehicle feature 106, the vehicle feature 106 operates accordingly. At step 924, the user is presented with an updated settings within the corresponding vehicle feature settings menu icon to reflect the current setting established by the ECU 104 (at step 922). In an exemplary embodiment, the ECU 104 communicates the (changed) current setting through the communication device 118 to be reflected by the virtual reality module 138 on the augmented reality user interface 140. As the user continues to pan the portable electronic device 110 about the vehicle 102, this process can repeatedly reoccur.

As discussed, various embodiments of the augmented reality system 100 can be utilized for the user to view the augmented image of the vehicle 102 as captured by the portable electronic device 110. Also, numerous components and technologies that have not been discussed herein can be utilized to compute operations associated with the augmented reality vehicle interface application 130 and to control and manipulate vehicle features 106. It is to be appreciated that in addition of the portable electronic device 110, the augmented reality vehicle interface application 130 can be utilized on different types of devices that are in production and that are not yet in production. For example, the augmented reality vehicle interface application 130 can be installed and utilized using an optical head-mounted display that can operate independently or in conjunction with a user input device.

The embodiments discussed herein can also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data. Computer-readable storage media excludes non-transitory tangible media and propagated data signals.

It will be appreciated that various implementations of the above-disclosed and other features and functions, or alternatives or varieties thereof, can be desirably combined into many other different systems or applications. Also that various presently unforeseen or unanticipated alternatives, modifications, variations or improvements therein can be subsequently made by those skilled in the art which are also intended to be encompassed by the following claims.

The invention claimed is:

1. A method for providing an augmented reality vehicle interface comprising:
   receiving an image of a vehicle with an image capturing device;
   identifying points of interest within portions of the image of the vehicle that correspond with vehicle features;

identifying a user classification category of the user that is capturing the image of the vehicle, wherein identifying the user classification category of the user that is capturing the image of the vehicle includes determining whether a driver or a passenger is operating the image capturing device while capturing the image of the vehicle, wherein determining whether the driver or the passenger is operating the image capturing device includes determining a cardinal and ordinal position of the image capturing device with respect to the vehicle while the user is capturing the image of the vehicle, wherein a guidance point is assigned at a location of a front portion of the vehicle that is based on the cardinal position of the image capturing device, and the guidance point is utilized to determine the ordinal position of the image capturing device, wherein determining whether the driver or the passenger is operating the image capturing device includes determining a location within the vehicle where the user capturing the image of the vehicle is located, wherein determining the location within the vehicle where the user capturing the image of the vehicle is located includes determining directional degrees of the location of the image capturing device with respect to the guidance point, wherein the location of the vehicle includes at least one of: a left front seat of the vehicle, a center front seat of the vehicle, a right front seat of the vehicle, a left rear seat of the vehicle, a center rear seat of the vehicle, and a center right seat of the vehicle, and wherein the user classification category is identified based on the location within the vehicle where the user capturing the image of the vehicle is located;

presenting an augmented reality image of the vehicle by overlaying one or more virtual user interface objects on the points of interest, wherein the one or more virtual user interface objects are overlaid as one or more circular points of focus over the points of interest, wherein the one or more virtual user interface objects are presented based on whether the driver or the passenger is operating the image capturing device while capturing the image of the vehicle; and controlling the vehicle features via the one or more virtual user interface objects.

2. The method of claim 1, wherein identifying points of interest within portions of the image of the vehicle that correspond with the vehicle features includes determining a directional orientation and positional location of the image capturing device with respect to the vehicle and identifying the vehicle features being captured by the image capturing device based on the direction and position of the image capturing device with respect to the vehicle.

3. The method of claim 1, wherein identifying points of interest within portions of the image of the vehicle that correspond with the vehicle features includes identifying the location of a predetermined marker as a focal point within the image at a portion of the vehicle, and identifying points of interests based on the location of the predetermined marker by determining an orientation of the image capturing device.

4. The method of claim 1, wherein presenting the augmented reality image of the vehicle includes providing the one or more virtual user interface objects shown on an augmented reality user interface that includes a plurality of vehicle feature interface icons that correspond to the vehicle features, wherein the plurality of vehicle feature interface icons are presented based on whether the driver or the passenger is operating the image capturing device when capturing the image of the vehicle.

5. The method of claim 4, wherein presenting the augmented reality image of the vehicle includes providing the one or more virtual user interface objects shown on the augmented reality user interface that includes a plurality of vehicle feature settings menus icons on a vehicle feature settings menu that are utilized to determine the settings associated with the vehicle features, wherein the plurality of vehicle feature settings menus icons are presented based on whether the driver or the passenger is operating the image capturing device when capturing the image of the vehicle.

6. The method of claim 5, wherein presenting the augmented reality image of the vehicle includes providing the one or more virtual user interface objects shown on the augmented reality user interface that includes a plurality of vehicle feature settings sub-menu icons on a vehicle feature settings sub-menu that are utilized to manipulate the settings associated with the vehicle features, wherein the plurality of vehicle feature settings sub-menus icons are presented based on whether the driver or the passenger is operating the image capturing device when capturing the image of the vehicle.

7. The method of claim 1, wherein controlling one or more types of the vehicle features includes communicating with an electronic control unit of the vehicle via peer to peer communication between the image capturing device and the electronic control unit of the vehicle and receiving settings data associated with the vehicle features associated with the points of interest.

8. The method of claim 7, wherein the controlling one or more types of the vehicle features includes receiving one or more user inputs on the plurality of vehicle feature settings sub-menu icons on the vehicle feature settings sub-menu associated with a corresponding vehicle feature and communicating with the electronic control unit of the vehicle to change settings data associated with the corresponding vehicle features.

9. A system for providing an augmented reality vehicle interface, comprising:

a memory storing instructions that when executed by a processor cause the processor to:

receiving an image of a vehicle with an image capturing device;

identify points of interest that correspond with vehicle features within portions of an image of the vehicle;

identify a user classification category of the user that is capturing the image of the vehicle, wherein identifying the user classification category of the user that is capturing the image of the vehicle includes determining whether a driver or a passenger is operating the image capturing device while capturing the image of the vehicle, wherein determining whether the driver or the passenger is operating the image capturing device includes determining a cardinal and ordinal position of the image capturing device with respect to the vehicle while the user is capturing the image of the vehicle, wherein a guidance point is assigned at a location of the front portion of the vehicle that is based on the cardinal position of the image capturing device, and the guidance point is utilized to determine the ordinal position of the image capturing device, wherein determining whether the driver or the passenger is operating the image capturing device includes determining a location within the vehicle where the user capturing the image of the vehicle is located, wherein determining the location within the vehicle where the user capturing the image of the vehicle is located includes determining directional degrees of the location of the image capturing device with respect to the guidance point, wherein the location of the vehicle includes at least one of: a left front seat of the vehicle, a center front seat of the vehicle, a right front seat of the vehicle, a left rear seat of the vehicle, a center rear seat of the vehicle, and a center right seat of the vehicle, and wherein the user classification category is identified based on the location within the vehicle where the user capturing the image of the vehicle is located;

present an augmented reality image of the vehicle by overlaying one or more virtual user interface objects on the point of interest, wherein the one or more virtual user interface objects are overlaid as one or more circular points of focus over the points of interest, wherein the one or more virtual user interface objects are presented based on whether the driver or the passenger is operating the image capturing device while capturing the image of the vehicle; and controlling the vehicle features via the one or more virtual user interface objects.

10. The system of claim 9, wherein the image capturing device includes a portable electronic device with a camera, a control unit, memory, a touch screen display, a communication device, and a plurality of sensors.

11. The system of claim 10, wherein a directional orientation and positional location of the image capturing device with respect to the vehicle is determined to identify the points of interest by utilizing the plurality of sensors included within the portable electronic device and a digital compass included within the vehicle to thereby identify the directional orientation of the vehicle and the portable electronic device, and triangulate the position of the portable electronic device with respect to the vehicle.

12. The system of claim 10, wherein overlaying one or more virtual user interface objects that correspond to the vehicle features on the points of interests includes presenting an augmented reality user interface of the vehicle that includes one or more vehicle feature interface icons overlaid upon the points of interest, wherein the plurality of vehicle feature interface icons are presented based on whether the driver or the passenger is operating the portable electronic device when capturing the image of the vehicle.

13. The system of claim 12, wherein overlaying one or more virtual user interface objects that correspond to the vehicle features on the points of interests includes presenting the augmented reality user interface of the vehicle that includes a plurality of vehicle feature settings menus icons on a vehicle feature settings menu, wherein the plurality of vehicle feature settings menus icons are presented based on whether the driver or the passenger is operating the portable electronic device when capturing the image of the vehicle.

14. The system of claim 13, wherein overlaying one or more virtual user interface objects that correspond to the vehicle features on the points of interests includes presenting the augmented reality user interface of the vehicle that includes a plurality of vehicle feature settings sub-menu icons on a vehicle feature settings sub-menu that are utilized to determine the settings associated with the vehicle features, wherein the plurality of vehicle feature settings sub-menus icons are presented based on whether the driver or the passenger is operating the portable electronic device when capturing the image of the vehicle.

15. The system of claim 10, wherein the communication device of the portable electronic device communicates with an electronic control unit of the vehicle via peer to peer communication and receives settings data associated with the vehicle features associated with points of interest.

16. The system of claim 15, wherein the communication device of the portable electronic device communicates with the electronic control unit of the vehicle to change settings data associated with the vehicle features associated with the points of interest based on the user input received on the one or more virtual user interface objects of the augmented reality user interface presented on the touch screen display.

17. A non-transitory computer readable storage medium storing instructions that when executed by a computer, which includes a processor perform a method, the method comprising:

receiving an image of a vehicle with an image capturing device;

identifying points of interest within portions of the image of the vehicle that correspond with vehicle features;

identifying a user classification category of the user that is capturing the image of the vehicle, wherein identifying the user classification category of the user that is capturing the image of the vehicle includes determining whether a driver or a passenger is operating the image capturing device while capturing the image of the vehicle, wherein determining whether the driver or the passenger is operating the image capturing device includes determining a cardinal and ordinal position of the image capturing device with respect to the vehicle while the user is capturing the image of the vehicle, wherein a guidance point is assigned at a location of the front portion of the vehicle that is based on the cardinal position of the image capturing device, and the guidance point is utilized to determine the ordinal position of the image capturing device, wherein determining whether the driver or the passenger is operating the image capturing device includes determining a location within the vehicle where the user capturing the image of the vehicle is located, wherein determining the location within the vehicle where the user capturing the image of the vehicle is located includes determining directional degrees of the location of the image capturing device with respect to the guidance point, wherein the location of the vehicle includes at least one of: a left front seat of the vehicle, a center front seat of the vehicle, a right front seat of the vehicle, a left rear seat of the vehicle, a center rear seat of the vehicle, and a center right seat of the vehicle, and wherein the user classification category is identified based on the location within the vehicle where the user capturing the image of the vehicle is located;

presenting an augmented reality image of the vehicle by overlaying one or more virtual user interface objects on the points of interest, wherein the one or more virtual user interface objects are overlaid as one or more circular points of focus over the points of interest, wherein the one or more virtual user interface objects are presented based on whether the driver or passenger is operating the image capturing device while capturing the image of the vehicle; and controlling the vehicle features via the one or more virtual user interface objects.

* * * * *